(12) United States Patent
Pecoraro

(10) Patent No.: US 12,651,246 B2
(45) Date of Patent: Jun. 9, 2026

(54) SYSTEM AND METHOD FOR PROVIDING MULTIPLE-SECRET SIGNING

(71) Applicant: The Bank of New York Mellon, New York, NY (US)

(72) Inventor: James Pecoraro, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 200 days.

(21) Appl. No.: 18/398,253

(22) Filed: Dec. 28, 2023

(65) Prior Publication Data

US 2025/0217793 A1     Jul. 3, 2025

(51) Int. Cl.
G06Q 20/36 (2012.01)
(52) U.S. Cl.
CPC ............................... G06Q 20/3674 (2013.01)
(58) Field of Classification Search
None
See application file for complete search history.

(56) References Cited

U.S. PATENT DOCUMENTS

| | | | | |
|---|---|---|---|---|
| 11,818,260 B1 * | 11/2023 | Vald | ...................... | H04L 9/0861 |
| 2023/0421366 A1 * | 12/2023 | Davies | ...................... | H04L 9/50 |

* cited by examiner

*Primary Examiner* — Jamie R Kucab
(74) *Attorney, Agent, or Firm* — Pillsbury Winthrop Shaw Pittman, LLP

(57) ABSTRACT

Systems and methods for providing multiple-secret signing receive, by a wallet service, an instruction to initiate a transaction; request, by the wallet service, an address from an address service; generate, by the address service, a secret derivation path; encrypt, by the address service, the secret derivation path with a first public key of a signing service, in which the address is transmitted to the wallet service with the encrypted secret derivation path; retrieve by the wallet service, transaction information for the address; receive, by the signing service, the instruction, the transaction information, and the address with the encrypted secret derivation path; decrypt, by the signing service, the secret derivation path, using a first private key of the signing service; derive, by the signing service, a second private key, using the decrypted secret derivation path; and sign, by the signing service, the transaction using the derived second private key.

20 Claims, 3 Drawing Sheets

100

200

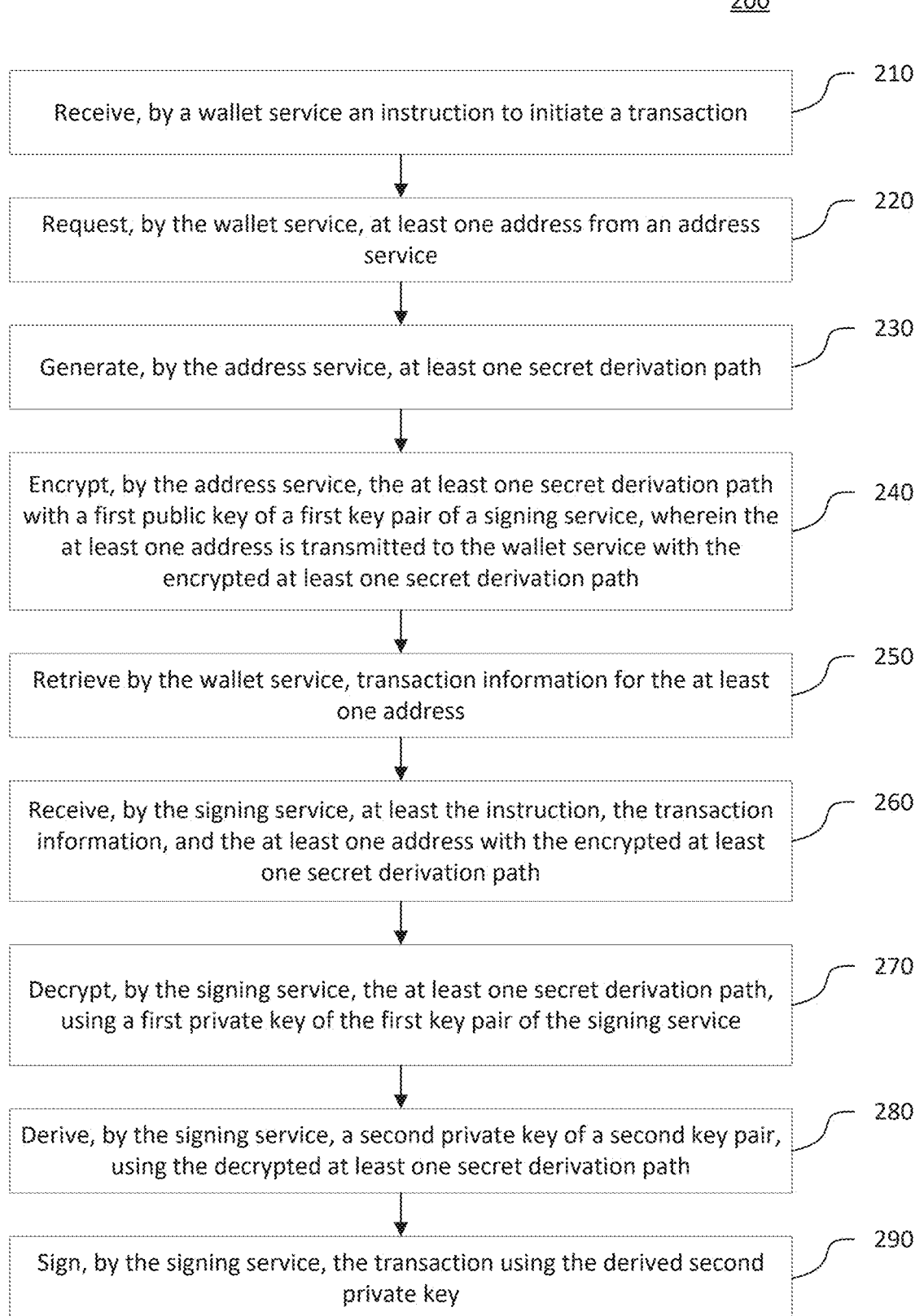

210
Receive, by a wallet service an instruction to initiate a transaction

220
Request, by the wallet service, at least one address from an address service 230
Generate, by the address service, at least one secret derivation path 240
Encrypt, by the address service, the at least one secret derivation path with a first public key of a first key pair of a signing service, wherein the at least one address is transmitted to the wallet service with the encrypted at least one secret derivation path 250
Retrieve by the wallet service, transaction information for the at least one address 260
Receive, by the signing service, at least the instruction, the transaction information, and the at least one address with the encrypted at least one secret derivation path 270
Decrypt, by the signing service, the at least one secret derivation path, using a first private key of the first key pair of the signing service 280
Derive, by the signing service, a second private key of a second key pair, using the decrypted at least one secret derivation path 290
Sign, by the signing service, the transaction using the derived second private key

FIG. 2

SYSTEM AND METHOD FOR PROVIDING MULTIPLE-SECRET SIGNING

CROSS-REFERENCE TO RELATED APPLICATIONS

No cross-reference is presented at this time.

BACKGROUND

Current systems designed for secure cryptographic signing adopt a strategy of fragmenting key material and dispersing these fragments across numerous machines. This approach poses operational challenges, demanding an intricate separation of duties setup to uphold security standards. However, these systems may encounter flaws that may compromise their effectiveness as a trade-off for flexibility.

Within these systems, a service responsible for signing transactions for blockchain publication typically relies on private keys that demand stringent security measures. These keys are typically derived from a root private key using a cryptographic hash function, as per the guidelines outlined in BIP32.

The prevailing approach considers the root private key as private, while the accompanying string input required for key derivation is often treated as either widely known or easily deducible.

Moreover, wallet services commonly adhere to the Bitcoin Improvement Proposal 44 (BIP44) convention for the string variable, making it predictably guessable. Alternatively, certain services opt to generate random private keys rather than deriving them from a root key. Unfortunately, both strategies rely on a single secret, inherently rendering them less secure and potentially susceptible to exploitation.

In essence, the current cryptographic signing systems face potential issues arising from the fragmentation and distribution of key material, alongside flawed practices in key derivation and usage, as they essentially rely on a single secret for protection. These flaws may compromise the security of sensitive information and emphasize the need for more robust and comprehensive security measures to address these potential vulnerabilities effectively.

Accordingly, what is needed are systems and methods which enable multiple layers of security by providing multiple-secret signing, e.g., when increased security over flexibility is warranted.

SUMMARY

Aspects of the disclosure relate to methods, apparatuses, and/or systems for providing multiple key encryption.

In some aspects, the techniques described herein relate to a method for providing multiple-secret signing, including: receiving, by a wallet service, an instruction to initiate a transaction; requesting, by the wallet service, at least one address from an address service; generating, by the address service, at least one secret derivation path; encrypting, by the address service, the at least one secret derivation path with a first public key of a first key pair of a signing service, in which the at least one address is transmitted to the wallet service with the encrypted at least one secret derivation path; retrieving by the wallet service, transaction information for the at least one address; receiving, by the signing service, at least the instruction, the transaction information, and the at least one address with the encrypted at least one secret derivation path; decrypting, by the signing service, the at least one secret derivation path, using a first private key of the first key pair of the signing service; deriving, by the signing service, a second private key of a second key pair, using the decrypted at least one secret derivation path; and signing, by the signing service, the transaction using the derived second private key.

In some aspects, the techniques described herein relate to a method, in which at least one of the wallet service, the address service, or the signing service, resides in one or more secure enclaves.

In some aspects, the techniques described herein relate to a method, in which the transaction information for the at least one address is retrieved by the wallet service from a blockchain network.

In some aspects, the techniques described herein relate to a method, further including publishing the signed transaction to a blockchain network.

In some aspects, the techniques described herein relate to a method, in which generating, by an address service, the at least one secret derivation path includes generating a random string in a format of a Bitcoin Improvement Proposal (BIP) 44 derivation path.

In some aspects, the techniques described herein relate to a method, in which deriving, by the signing service, the second private key of the second key pair, using the decrypted at least one secret derivation path further includes: implementing a key derivation function (KDF) that derives the second private key using the decrypted at least one secret derivation path.

In some aspects, the techniques described herein relate to a method, in which the at least one secret derivation path is randomly generated.

In some aspects, the techniques described herein relate to a method, in which the transaction information includes at least balance and nonce information.

In some aspects, the techniques described herein relate to a system for providing multiple-secret signing, implemented by one or more processors, the system including: one or more code sets stored in memory and executed by the one or more processors, which, when executed, configure the one or more processors to: receive, by a wallet service, an instruction to initiate a transaction; request, by the wallet service, at least one address from an address service; generate, by the address service, at least one secret derivation path; encrypt, by the address service, the at least one secret derivation path with a first public key of a first key pair of a signing service, in which the at least one address is transmitted to the wallet service with the encrypted at least one secret derivation path; retrieve by the wallet service, transaction information for the at least one address; receive, by the signing service, at least the instruction, the transaction information, and the at least one address with the encrypted at least one secret derivation path; decrypt, by the signing service, the at least one secret derivation path, using a first private key of the first key pair of the signing service; derive, by the signing service, a second private key of a second key pair, using the decrypted at least one secret derivation path; and sign, by the signing service, the transaction using the derived second private key.

In some aspects, the techniques described herein relate to a system, in which at least one of the wallet service, the address service, or the signing service, resides in one or more secure enclaves.

In some aspects, the techniques described herein relate to a system, in which the transaction information for the at least one address is retrieved by the wallet service from a blockchain network.

In some aspects, the techniques described herein relate to a system, in which the one or more processors are further configured to: publish the signed transaction to a blockchain network.

In some aspects, the techniques described herein relate to a system, in which generating, by an address service, the at least one secret derivation path includes generating a random string in a format of a Bitcoin Improvement Proposal (BIP) 44 derivation path.

In some aspects, the techniques described herein relate to a system, in which when deriving, by the signing service, the second private key of the second key pair, using the decrypted at least one secret derivation path further, the one or more processors are further configured to: implement a key derivation function (KDF) that derives the second private key using the decrypted at least one secret derivation path.

In some aspects, the techniques described herein relate to a system, in which the at least one secret derivation path is randomly generated.

In some aspects, the techniques described herein relate to a system, in which the transaction information includes at least balance and nonce information. 17.

In some aspects, the techniques described herein relate to a method for providing multiple-secret signing, including: generating, by an address service, at least one secret derivation path in response to a request from a wallet service for at least one an address; encrypting, by the address service, the at least one secret derivation path with a first public key of a first key pair of a signing service, in which the at least one address is transmitted to the wallet service with the encrypted at least one secret derivation path; receiving, by the signing service from the wallet service, at least an instruction to initiate a transaction, transaction information for the at least one address, and the at least one address with the encrypted at least one secret derivation path; decrypting, by the signing service, the at least one secret derivation path, using a first private key of the first key pair of the signing service; deriving, by the signing service, a second private key of a second key pair using the decrypted at least one secret derivation path; and signing, by the signing service, the transaction using the derived second private key.

In some aspects, the techniques described herein relate to a method, in which the transaction information for the at least one address is retrieved by the wallet service from a blockchain network.

In some aspects, the techniques described herein relate to a method, further including publishing the signed transaction to a blockchain network.

In some aspects, the techniques described herein relate to a method, in which the at least one secret derivation path is randomly generated.

Various other aspects, features, and advantages will be apparent through the detailed description and the drawings attached hereto. It is also to be understood that both the foregoing general description and the following detailed description are illustrative and not restrictive of the scope of the disclosure.

BRIEF DESCRIPTION OF THE FIGURES

FIG. 2 depicts an example method for providing multiple-secret signing, in accordance with at least one embodiment; and

4

Figure 3:
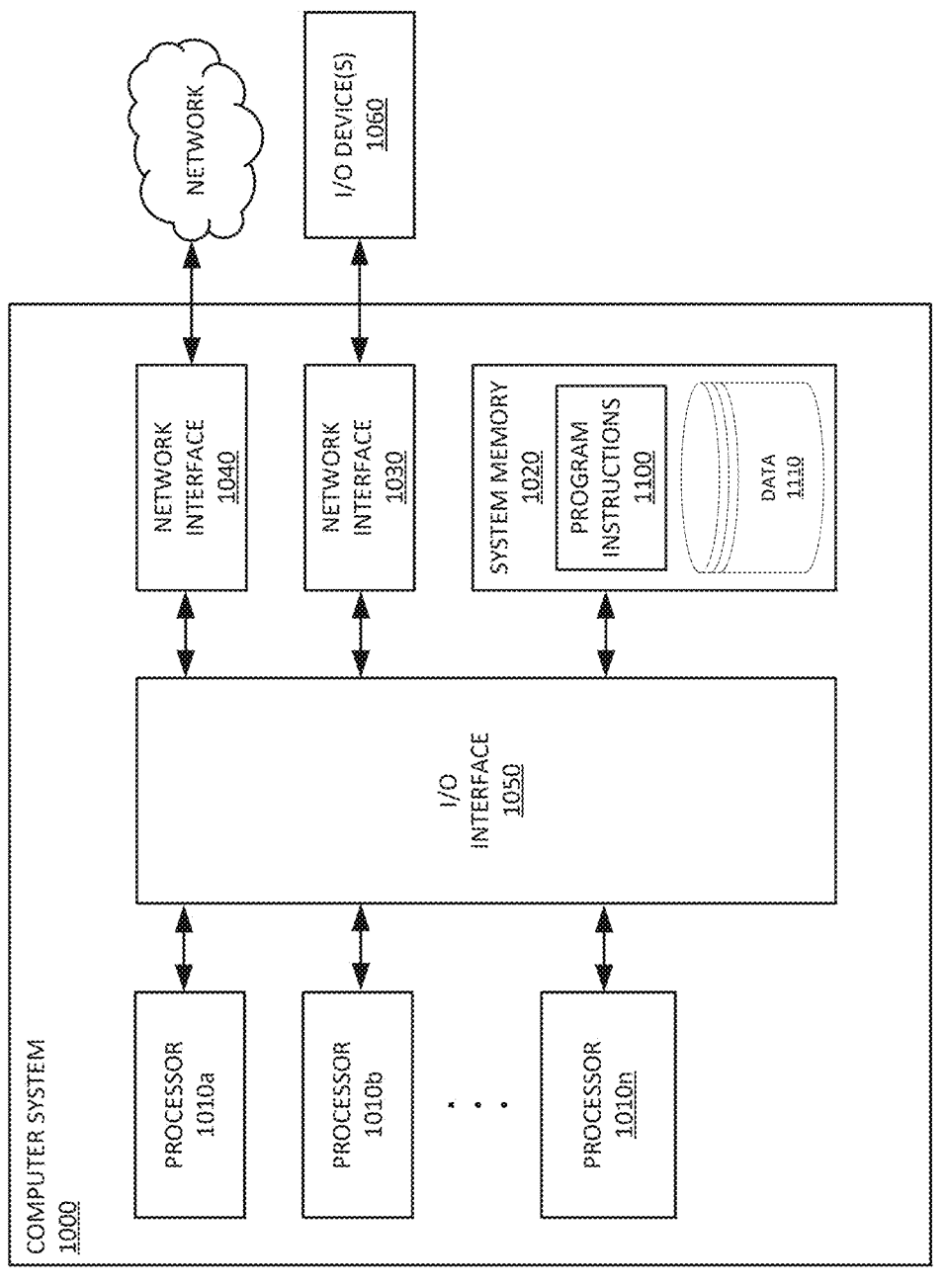

FIG. 3 depicts an example computer system on which systems and methods described herein may be executed, in accordance with at least one embodiment.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the various embodiments. It will be appreciated, however, by those having skill in the art, that the embodiments may be practiced without these specific details, or with an equivalent arrangement. In other cases, well-known structures and devices are shown in block diagram form in order to avoid unnecessarily obscuring the embodiments.

To mitigate the problems described herein, the inventors had to both invent solutions and, in some cases just as importantly, recognize problems overlooked (or not yet foreseen) by others in the field of instruction validation. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The security of the keys used for encryption in a digital assets platform is of paramount importance. In general, a service that signs transactions, e.g., that are to be published to a public blockchain, requires a very high level of privilege and security. Present encryption systems employing, for example, BIP44 convention, require only the storage of a single number, the index to be used next. In contrast, having a cryptographic signing system that mandates multiple secrets and/or requiring that all secret paths be stored, provides a robust and multi-layered approach to security, which may significantly fortify the overall resilience of the system. By requiring multiple secrets for authentication and authorization, the system may be more resistant to various forms of attacks and unauthorized access attempts. Even if one key or secret is compromised, lost, or stolen, the remaining secrets act as barriers, protecting against a complete breach and ensuring the system's continued integrity. This multiple secret approach not only mitigates the risk of a single point of failure but also may enhance accountability by necessitating the involvement of multiple authorized parties in critical operations.

Moreover, it may offer greater adaptability, enabling easier management of access privileges and key rotation without disrupting the system's functionality. A multiple-secret system may align with security standards that mandate more robust security measures, which may align to industry-specific regulations and standards.

Embodiments of the systems and methods described herein address the need for enhanced security in the cryptographic signing system by implementing a strategy that involves at least two separately secured secrets: the root private key and a secure secret string for key derivation. This approach may strengthen the system's security posture by introducing a multi-factor authentication method. Firstly, the root private key, being one of the secrets, remains securely stored and isolated from other components of the system. Simultaneously, the addition of a secure secret string for key derivation introduces an additional layer of complexity. This string may be deliberately made improbable (or functionally difficult) to guess or derive, further bolstering the security of the process.

By requiring both the root private key and the secure secret string to reproduce the derived private key, the system may implement a two-factor authentication mechanism. Even if an attacker gains access to one of these secrets, they would still require the other to successfully generate the derived private key. The separation and secure storage of these two secrets mitigate the risk of a single point of failure.

Embodiments described in detail herein may introduce a robust security measure by generating a secret derivation string, adding an extra layer of complexity to the system. These generated strings may be fortified using cryptographic features, which may help secure their storage and protect against unauthorized access. In some embodiments, the signing service may play a pivotal role in key derivation for signing purposes. It necessitates the use of a secret string, e.g., a secret derivation path, to derive the private key essential for signing transactions securely. To facilitate this process, in some embodiments, an address service may be configured to respond to queries for random (or pseudorandom) strings. However, it responds by encrypting these strings in a manner designed to allow only the signing service possessing the capability to decrypt them. The encrypted secret strings may then be transmitted to the signing service along with the transaction to be signed, facilitated by a wallet service. By forwarding these encrypted strings, the signing service, and only the signing service, possesses the decryption capability required to access and utilize the secret strings for the derivation of the necessary private key during the signing process. This approach creates a controlled and secure flow of sensitive information, preventing unauthorized parties from accessing or deciphering the secret strings and maintaining a secure link between the wallet service, address service, the signing service, and a blockchain network on which the transaction is to be written.

Those with skill in the art will appreciate that inventive concepts described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions. These and other features are described in detail herein with reference to the foregoing figures.

Figure 1:
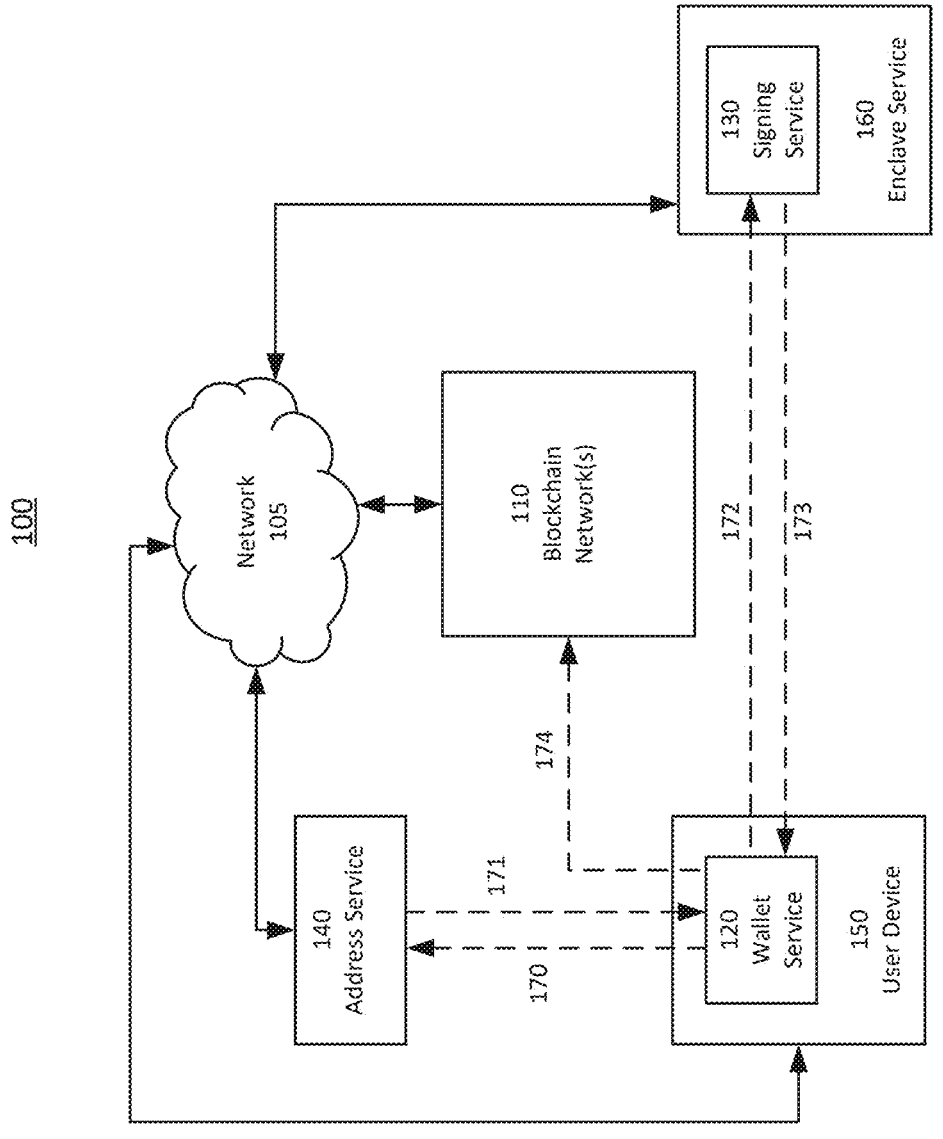
FIG. 1 depicts an illustrative system for providing multiple-secret signing, in accordance with at least one embodiment.

FIG. 1 depicts an illustrative system for providing multiple-secret signing, in accordance with at least one embodiment. FIG. 1 illustrates a functional block diagram of an embodiment of a multiple-secret signing system 100 within which at least some of the disclosed techniques may be implemented. The multiple-secret signing system 100 may be established to permit the writing or recording of transactions to a blockchain network 110 via network 105. In some embodiments, multiple-secret signing system 100 may constitute at least part of a data management platform or digital assets platform that implements the digital assets instruction processing (or transaction processing) of a request for a change to the blockchain. As further shown in FIG. 1, various communications between wallet service 120, address service 140, signing service 130, and blockchain network 110 may occur over network 105, and these communications may be represented by data flows 170-174.

In some embodiments, blockchain network 110, may be a public blockchain, which is open and decentralized, accessible to a global user base. In some embodiments, blockchain network 110 may be a private blockchain which is a restricted and/or centralized network used for specific organizational or consortium-based applications, e.g., with an emphasis on privacy and control. Elements of multiple-secret signing system 100 may communicate with one or more of the other elements and/or with blockchain network 110 or other entities via the network 105. These communications may include, for example, a request for at least one address (data flow 170), transmission of the at least one address with an encrypted secret derivation path (data flow 171), transmission of an instruction, transaction information, and the at least one address with the encrypted secret derivation path (data flow 172), transmission of a signed transaction (data flow 173), and publication of the signed transaction to blockchain network 110 (data flow 174), as described elsewhere herein.

In some embodiments, each of the elements of multiple-secret signing system 100 may be or may include applications executed on respective computing systems, though this need not always be the case. In some examples, one or more of the applications may be executed on a single computing system (which is not to suggest that such a computing system may not comprise multiple computing devices or nodes, or that each computing device or node need be co-located; indeed, a computing system comprising multiple servers that house multiple computing devices may be operated by a single entity and the multiple servers may be distributed, e.g., geographically). For example, in some embodiments, an entity may execute one or more of a wallet service 120, a signing service 130, an address service 140, and/or various other applications on a single computing system or across multiple computing systems associated with the entity. Moreover, in some examples, the entity may also provide users access to wallet service 120 on a user device 150, which may be a web-based application hosted by a computing system managed by or provisioned by the entity, or which communicates with such a computing system via an application programming interface (API). Accordingly, one or more of the depicted entities may communicate with one another via messages transmitted over network 105, such as the Internet and/or various other local area networks. For example, one or more applications may communicate via messages transmitted over network 105.

In some example embodiments, wallet service 120 may be a client/customer/end user facing application or individual user application with which a user interfaces to manage their account, e.g., data, assets, etc., and/or specify or send instructions, e.g., to execute a transaction or send a communication. While only one instance of a wallet service 120 is shown, embodiments of the multiple-secret signing system 100 may include tens, hundreds, thousands, or more such applications accessed by different users on or from their respective computing systems (e.g., user device 150). In some examples, such an application may also, or alternatively, be used internally, such as by an account or fund manager that specifies instructions or transactions, e.g., for a user or within a fund. In some examples, such an application may also, or alternatively, be used by various systems that communicate data requiring encryption and decryption, with or without human intervention. The wallet service 120 and users of the system (e.g., end users and/or internal managers, etc.) may be isolated from accessing some or all of the features and/or information associated with signing service 130, address service 140, and/or other system applications, and vice versa, except as described herein.

In some embodiments, wallet service 120 may include a user interface through which a user may interact with multiple-secret signing system 100, e.g., via user device 150. For example, a user may desire to communicate sensitive data or execute a digital asset transaction. According to embodiments, the user may interact with a user interface of wallet service 120, accessing only the data which a user/user account of the user device 150 is permitted to view, which in turn may send a request or instruction, via an application programming interface (API) associated with a signing service 130, to facilitate a transaction between one user and another user on blockchain network 110.

In some example embodiments, wallet service 120 may access information about securities, such as security prices, from the blockchain network 110 (or from a 3rd party), to determine whether to effectuate one or more trades of a security on blockchain network 110, which in some examples may comprise transmitting properties for a transaction to be effectuated on the market. In other example use cases, the wallet service 120 may access information about other types of assets (e.g., currencies, tokens, goods, or services, etc.), availability (e.g., inventory information), costs of assets (e.g., market), among other information by which an instruction regarding a transaction for goods or services may be specified. Additional and/or alternate types of transactions may be used within the scope of this disclosure. The wallet service 120 may store accounting application records indicative of properties of transactions specified by users of the wallet service 120 to be effectuated or may access such records remotely as requested. An example of such transactions and their associated properties may be for trades (e.g., buying, selling, etc.) of assets on a blockchain network 110 based on asset prices.

In some example embodiments, wallet service 120 is an internally facing application by which agents or employees of an entity manage data or assets of the entity or other third parties, e.g., clients. While only one instance of a wallet service 120 is shown, embodiments of the environment 100 may permit multiple agents or employees of an entity implementing wallet service 120 to access respective instances of such an application from their respective computing systems (e.g., respective user devices 150) based on their credentials. In some embodiments, each user may be required to provide separate login information and/or other credentials before being provided access. In some examples, wallet service 120 may provide information about assets held by the entity or third parties associated with the entity, and transactions corresponding to those assets. Some or all of those transactions may be effectuated by the entity based on properties of transactions specified by users of wallet service 120.

In some embodiments, multiple-secret signing system 100 may include signing service 130. A typical signing service in cryptographic systems is responsible for generating and managing cryptographic signatures required for validating and authorizing transactions or data. It securely holds private keys and performs cryptographic operations to produce digital signatures, and to protect the authenticity, integrity, and non-repudiation of information.

In contrast, signing service 130, in some embodiments, introduces an additional layer of security and complexity by involving a multi-step process in which the signing service 130 does not directly possess the secret strings necessary for key derivation. Instead, in some embodiments, these secret strings, e.g., secret derivation paths, required for private key derivation, may be securely stored and managed by the address service 140. The address service 140 may encrypts these strings in a manner that only the specific signing service 130 can decrypt them, as described in detail herein.

This departure from the traditional signing service setup creates a separation of responsibilities. The typical signing service traditionally retains control over the entire signing process, including the necessary key material. However, in embodiments of multiple-secret signing system 100, the role of signing service 130 is more specialized, as it relies on the address service 140 to provide the encrypted secret string required for private key derivation, enhancing security by minimizing direct access to sensitive key material.

In some embodiments, multiple-secret signing system 100 may include address service 140. Typically address services manage the creation, storage, and retrieval of addresses and associated cryptographic key pairs used in various cryptographic operations, especially in blockchain-based systems like Bitcoin. These addresses are often derived from hierarchical deterministic wallets (HD wallets) and follow a specific hierarchical structure to manage multiple addresses and keys. Typical address services employ derivation paths, which refer to the hierarchical structure used to generate a sequence of addresses and keys from a master key or seed. These paths are defined according to specific standards, such as BIP32 (Bitcoin Improvement Proposal 32) or BIP44, which outline how keys are typically derived in a hierarchical and deterministic manner. The derivation path typically begins with a master key or seed, from which a hierarchy of child keys may derived using a deterministic algorithm. These child keys may be organized in a tree-like structure, allowing the generation of multiple addresses and keys from a single starting point.

For instance, in BIP44-compliant systems, a derivation path might look like: "m/purpose'/coin_type'/account'/change/address_index". Each segment in the path may represent a particular level in the hierarchical structure: 'm' represents the master key; 'purpose' indicates the purpose of the keys (e.g., whether they're for a wallet, a specific cryptocurrency, etc.); 'coin_type' specifies the cryptocurrency type (e.g., Bitcoin, Ethereum); 'account' refers to a specific account within the wallet; 'change' distinguishes between receiving (0) and change (1) addresses; and 'address_index' represents the index of the address within that account.

The typical address services manage the generation of these derivation paths and the associated public keys and addresses based on user requests. They facilitate the creation of new addresses and track their usage. Address services may be employed to generate public addresses (also referred to as deposit addresses) using a root public key. Additionally, they ensure the deterministic generation of keys according to the specified derivation paths, enabling users to derive and manage multiple addresses and keys systematically and securely within the hierarchical structure of the cryptographic system. However, as noted above, such paths may be easily ascertained due to their predictable structure. Accordingly, in some embodiments, address service 140 may be configured to generate secret derivation paths which cannot be, e.g., reverse-engineered or easily derived. As described herein, these secret derivation paths may be combined with other cryptographic keys, to provide an enhance secure signing process employing multiple secrets.

In some embodiments, multiple-secret signing system 100 may include enclave service 160, which, in some embodiments, may host or otherwise include signing service 130. In some embodiments, signing service 130 may generate or otherwise provide ephemeral keys as needed. An enclave is a secure and isolated computational environment within a larger computing system, typically facilitated by hardware or software-based security mechanisms. Enclaves are designed to protect sensitive data and code by isolating them from the rest of the system, with the aim of preventing unauthorized access and tampering. This isolation assists with the operations and data within the enclave remaining confidential, maintain their integrity, and are shielded from external threats, even when the host system or its software components may be compromised. Enclaves are commonly used in modern computing for secure execution of critical applications, cryptographic operations, and the protection of sensitive data, making them integral to enhancing overall system security. It should be noted that while enclave service 160 is shown in FIG. 1 as being a standalone enclave hosting only signing service 130, in some embodiments, enclave service 160 may host other services, such as wallet service 120 and/or address service 140. In other embodiments, each service may be hosted in a separate enclave service.

These and other features of multiple-secret signing system 100 will be further understood with reference to the instruction validation method 200 of FIG. 2, herein.

FIG. 2 depicts an example method for providing multiple-secret signing, in accordance with at least one embodiment. In various embodiments, method 200 may be implemented by system 100, executing code in one or more processors therein. For example, in some embodiments, method 200 may be performed on a computer (e.g., computer system 1000 of FIG. 3) having one or more processors (e.g., processor(s) 1010 of FIG. 3) and memory (e.g., system memory 1020 of FIG. 3), and one or more code sets, applications, programs, modules, and/or other software stored in the memory and executing in or executed by one or more of the processor(s).

Method 200 begins at step 210 when a wallet service (e.g., wallet service 120) receives (e.g., via one or more processors of multiple-secret signing system 100) an instruction to initiate a transaction. In some embodiments, a transaction instruction may act as a comprehensive set of directives essential for initiating a transfer on a blockchain network. It may encompass details needed for a successful transaction, starting with the recipient's information, specifying their blockchain address or identifier. Additionally or alternatively, a transaction instruction may include the amount of assets or currency to be transferred. Depending on the blockchain protocol or application, this instruction may also incorporate supplementary parameters like transaction fees, messages, gas limits, or specific conditions relevant to the transaction. In some embodiments, e.g., in cases requiring cryptographic authorization, the instruction may include details about the required digital signature or private key(s) necessary for validating and authorizing the transfer. Finally, in some embodiments, the transaction information may include at least balance and nonce information.

Balance information within transaction information may refer to the specific amount of cryptocurrency or tokens held in a particular address or account on a blockchain. It may represent the available funds that can be utilized for conducting transactions. In some embodiments, when a transaction takes place, the balance information associated with the sender's address may be reduced by the transaction amount, while the recipient's balance increases accordingly. Users often rely on blockchain explorers or wallet interfaces to access and verify the current balance linked to an address before initiating any transactions.

Nonce information may serve as a unique and sequential identifier attached to transactions within a blockchain network. Nonces are intricately tied to the sender's account or address, ensuring that each transaction originating from that account possesses a distinct nonce value. Beginning typically from 0 and incrementing by 1 for every subsequent transaction, nonces may prevent replay attacks and maintain the correct order of transactions. In some embodiments, nonces may play an important role in maintaining the integrity and security of the blockchain by preventing duplication or tampering with transaction sequencing.

In some embodiments, receipt of a transaction request may trigger the wallet service to fetch or otherwise request generation of an ephemeral key pair for use in the transaction, as described herein. Ephemeral keys provide short-lived, temporary cryptographic key pairs for secure communication sessions or transactions. These keys enhance security by minimizing the exposure of long-term keys, reducing the risk of key compromise, and enabling forward secrecy, helping to see that past communications remain confidential even if long-term keys are compromised in the future. Ephemeral keys enhance security for real-time encryption and are commonly used in secure messaging, web browsing, and other applications where data privacy and confidentiality are paramount.

Ephemeral keys are typically generated using secure random number generators (RNGs) to create a new and random key pair for each session or transaction. For asymmetric cryptography, like Diffie-Hellman key exchange, ephemeral private and public keys are generated for each session or transaction. For symmetric cryptography, a new symmetric key is generated for each session. These keys are typically generated using a combination of entropy sources, such as hardware-based randomness or system-generated entropy, to help facilitate unpredictability and security. The ephemeral keys are used only for a short period, enhancing security by reducing the exposure of long-term cryptographic keys.

In some embodiments, an ephemeral public key may be fetched or otherwise requested by the wallet service from the signing service. As noted herein, in some embodiments, signing service 130 may be configured to generate or otherwise manage one or more sets of ephemeral public/ private key pairs. Accordingly, in some embodiments, the wallet service may be configured to request, fetch, or otherwise obtain an ephemeral public key from signing service 130, while 130 may retain the corresponding ephemeral private key for future use, e.g., decryption. In some embodiments, the ephemeral public key may be transmitted to the address service, for future use, e.g., encryption.

At step 220, in some embodiments, the wallet service may request (e.g., via one or more processors of multiple-secret signing system 100) at least one address from an address service (e.g., address service 140). In some embodiments, a wallet service may request an address from an address service for enhanced security measures, hierarchical key management, and/or the delegation of complex cryptographic procedures. By relying on an address service for address generation, the wallet service may mitigate the risk associated with directly handling sensitive cryptographic operations, thereby minimizing the potential exposure of private keys and bolstering overall security. In some embodiments, delegating address generation to a specialized service may further streamline the wallet service's functionalities, focusing on managing transactions and user interactions while ensuring consistent and valid address formats. This approach not only assists with address consistency and verification but also enables the wallet service to adhere to standardized protocols, reducing the likelihood of errors in key generation that could result in transaction failures or loss of funds.

An address, as understood herein, may refer to a unique identifier associated with a cryptocurrency wallet or an account on the blockchain. It is a cryptographic representation generated by the address service following specific algorithms and protocols defined by the blockchain network. In some embodiments, these addresses are used for sending and receiving transactions within the blockchain. They serve as destinations for transferring cryptocurrencies or tokens from one user to another. In some embodiments, each address may be a string of alphanumeric characters.

At step 230, in some embodiments, the address service may generate (e.g., via one or more processors of multiple-secret signing system 100) at least one secret derivation path. As explained herein, unlike typical blockchain transaction systems in which derivation paths provide specified pathways or series of steps within a hierarchical deterministic wallet (HD wallet) framework that determines how keys or addresses are generated and organized, in some embodiments as described herein the address service may instead generate a secret derivation path. In some embodiments, the at least one secret derivation path may be generated as a secret, randomized, or pseudorandomized string, e.g., in a format of a Bitcoin Improvement Proposal (BIP) 44 derivation path.

For example, in a typical system, BIP44 convention calls for path generation in a prescribed format: m/purpose'/coin_type'/account'/change/address_index (e.g., m/44'/60'/x'/0/0). In this example, x represents the account which may be assigned to a specific user in a system with multiple accounts, (e.g., is known within the system). The last zero in the example is an index for the address used by that account and is expected to be used in order. Specifically, BIP44 convention mandates that no gaps of more than a specified amount are allowed, otherwise, wallets implementing BIP44 convention may stop looking for assets. In this regard, wallets are typically configured to test for transactions at each address starting with the 0 until a predefined number (e.g., 5) of addresses with no transactions are searched.

Unlike conventional wallets employing BIP44 convention, in some embodiments, the address service may be configured to generate a random, pseudorandom, or otherwise secret number for the each of the fields in the path, e.g., m/44'/60/1945883745/0/2438293847. In some embodiments, the change and coin_type positions may be any 32-bit integer as well, e.g., m/44'/1458683745/1945883745/3829384743/2438293847, which would amount to $2^{\wedge}32*2^{\wedge}32*2^{\wedge}32*2^{\wedge}32$ (or $2^{\wedge}128$) possible paths.

Furthermore, as there is technically no limit on the number of dimensions of an address path (despite the convention being 5 dimensions), in some embodiments, one or more additional dimensions may be added, for example, to the end of a path, e.g., another 32-bit number may be added to the end. In some embodiments, the address service may be configured to store the secret values used (or the path string) for each generated path. With this large space of possible paths, guessing a path may be considered functionally impossible or significantly more improbable than in conventional systems, thus providing a heightened level of security.

In some embodiments, the address service may generate these secret derivation paths using, e.g., cryptographic techniques, randomization algorithms, and/or deterministic algorithms, ensuring that each secret derivation path is unique, securely derived, and/or unguessable.

At step 240, in some embodiments the address service may encrypt (e.g., via one or more processors of multiple-secret signing system 100) the at least one secret derivation path with a first public key of a first key pair of a signing service. As explained above, in some embodiments, when a transaction request is received by the wallet service, the signing service may be configured to provide a key pair and transmit the public key to the address service (e.g., via the wallet service or directly). In some embodiments, the key pair may be an ephemeral key pair (as described herein). In turn, the address service may be configured to encrypt the previously generated secret derivation path using the public key of the key pair, while the private key remains with the signing service. In some embodiments, the at least one address may then be transmitted to the wallet service with the encrypted at least one secret derivation path.

It should be noted that while various embodiments describe the address service using an ephemeral key to encrypt the secret paths, in other embodiments other encryptions methods may be employed to ensure that the addresses are encrypted such that they may only be decrypted by the signing service. By way of one example, in some embodiments, the signing service may be configured to sign an ephemeral address (e.g., related to an ephemeral key) so that the address service can be assured that it was the signing service that produced the ephemeral key.

At step 250, in some embodiments, the wallet service may retrieve (e.g., via one or more processors of multiple-secret signing system 100) transaction information for the at least one address. The transaction information for the at least one address may be retrieved by the wallet service from a blockchain network. As noted above, in some embodiments, the transaction information may include at least balance information and nonce information. In some embodiments, balance information and nonce information may be important components within transaction information, offering insights into available funds and facilitate the proper order and uniqueness of transactions on the blockchain. Of course, in other embodiments, other transaction information may be included.

At step 260, in some embodiments, the signing service may receive (e.g., via one or more processors of multiple-secret signing system 100) at least the instruction, the transaction information, and the at least one address with the encrypted at least secret derivation path. As explained herein, in some embodiments, the instruction to implement the transaction, the address, and the now-encrypted secret derivation path may be sent or otherwise transmitted from the wallet service to the signing service. It should be noted that in other embodiments, the address and the encrypted secret derivation path may be sent directly to the signing service from the address service, while the transaction is sent from the wallet service, etc.

At step 270, in some embodiments, the signing service may decrypt (e.g., via one or more processors of multiple-secret signing system 100) the at least one secret derivation path, using a first private key of the first key pair of the signing service. In some embodiments, the signing service may use the private key associated with the public key used to encrypt the secret derivation path (e.g., from an ephemeral key pair generated by the signing service). Because only the signing service has access to the private key, the secret derivation path is assured to stay secret even once decrypted.

At step 280, in some embodiments, the signing service may derive (e.g., via one or more processors of multiple-secret signing system 100) a second private key of a second key pair, using the decrypted at least one secret derivation path. In some embodiments, the signing service, may derive the second private key of the second key pair using the decrypted at least one secret derivation path by implementing a key derivation function (KDF) that derives the second private key using the decrypted at least one secret derivation path.

The BIP32 convention defines functions for deriving an address from a root key and path. The inputs to the functions are typically either a root private key or a root public key, and a path. When using a root private key, a derived private key may be generated, and when using a root public key, a derived public key may be generated. Accordingly, in some embodiments, the signing service may have sole access to a root private key, providing an additional level of secrecy within embodiments of the system.

Furthermore, making the path a secret (and delivering it to the signing service in a secured manner) adds a second secret to the system, as described in various embodiments herein. In some embodiments, paths may be known only to the address service until a request for a signing is made. In some embodiments, the signing service does not have access to the store of secret paths, which are instead securely delivered in a signing request, and may be destroyed on completion of the request. In some embodiments, the signing operation may be performed in an enclave to protect the memory of the process during the signing computation.

In some embodiments, one or more of a number of derivation functions may be used provided the same derivation function is employed by both the address service and the signing service (e.g., the address may generate the public addresses from the paths). In some embodiments, the implemented derivation function may align with the characteristics of the BIP32 convention: a root public key and a path would derive the public key that corresponds to the derived private key using the root private key and the same path.

Finally, at step 290, in some embodiments, the signing service may sign (e.g., via one or more processors of multiple-secret signing system 100) the transaction using the derived second private key. In some embodiments, signing of the transaction with the second private key may be the final step prior to implementing the transaction. Accordingly, in some embodiments, the signing service may transmit the signed transaction to the wallet service, which may publish the signed transaction to a blockchain network.

Some embodiments may execute the above operations on a computer system, such as the computer system of FIG. 3, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, external (e.g., third party) content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B may include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing multiple-secret signing, comprising:

receiving, by a wallet service, an instruction to initiate a transaction;

requesting, by the wallet service, at least one address from an address service;

generating, by the address service, at least one secret derivation path;

encrypting, by the address service, the at least one secret derivation path with a first public key of a first key pair of a signing service;

transmitting, by the address service, the at least one address with the encrypted at least one secret derivation path to the wallet service;

retrieving by the wallet service, transaction information for the at least one address;

receiving, by the signing service, at least the instruction, the transaction information, and the at least one address with the encrypted at least one secret derivation path;

decrypting, by the signing service, the at least one secret derivation path, using a first private key of the first key pair of the signing service;

deriving, by the signing service, a second private key of a second key pair, using the decrypted at least one secret derivation path; and signing, by the signing service, the transaction using the derived second private key.

2. The method of claim 1, wherein at least one of the wallet service, the address service, or the signing service, resides in one or more secure enclaves.

3. The method of claim 1, wherein the transaction information for the at least one address is retrieved by the wallet service from a blockchain network.

4. The method of claim 1, further comprising publishing the signed transaction to a blockchain network.

5. The method of claim 1, wherein generating, by an address service, the at least one secret derivation path comprises generating a random string in a format of a Bitcoin Improvement Proposal (BIP) 44 derivation path.

6. The method as in claim 1, wherein deriving, by the signing service, the second private key of the second key pair, using the decrypted at least one secret derivation path further comprises: implementing a key derivation function (KDF) that derives the second private key using the decrypted at least one secret derivation path.

7. The method as in claim 1, wherein the at least one secret derivation path is randomly generated.

8. The method as in claim 1, wherein the transaction information comprises at least balance and nonce information.

9. A system for providing multiple-secret signing, implemented by one or more processors, the system comprising:

one or more code sets stored in memory and executed by the one or more processors, which, when executed, configure the one or more processors to:

receive, by a wallet service, an instruction to initiate a transaction;

request, by the wallet service, at least one address from an address service;

generate, by the address service, at least one secret derivation path;

encrypt, by the address service, the at least one secret derivation path with a first public key of a first key pair of a signing service;

transmit, by the address service, the at least one address with the encrypted at least one secret derivation path to the wallet service;

retrieve by the wallet service, transaction information for the at least one address;

receive, by the signing service, at least the instruction, the transaction information, and the at least one address with the encrypted at least one secret derivation path;

decrypt, by the signing service, the at least one secret derivation path, using a first private key of the first key pair of the signing service;

derive, by the signing service, a second private key of a second key pair, using the decrypted at least one secret derivation path; and sign, by the signing service, the transaction using the derived second private key.

10. The system of claim 9, wherein at least one of the wallet service, the address service, or the signing service, resides in one or more secure enclaves.

11. The system of claim 9, wherein the transaction information for the at least one address is retrieved by the wallet service from a blockchain network.

12. The system of claim 9, wherein the one or more processors are further configured to: publish the signed transaction to a blockchain network.

13. The system of claim 9, wherein generating, by an address service, the at least one secret derivation path comprises generating a random string in a format of a Bitcoin Improvement Proposal (BIP) 44 derivation path.

14. The system of claim 9, wherein when deriving, by the signing service, the second private key of the second key pair, using the decrypted at least one secret derivation path further, the one or more processors are further configured to: implement a key derivation function (KDF) that derives the second private key using the decrypted at least one secret derivation path.

15. The system of claim 9, wherein the at least one secret derivation path is randomly generated.

16. The system of claim 9, wherein the transaction information comprises at least balance and nonce information.

17. A method for providing multiple-secret signing, comprising:

generating, by an address service, at least one secret derivation path in response to a request from a wallet service for at least one an address;

encrypting, by the address service, the at least one secret derivation path with a first public key of a first key pair of a signing service;

transmitting, by the address service, the at least one address with the encrypted at least one secret derivation path to the wallet service;

receiving, by the signing service from the wallet service, at least an instruction to initiate a transaction, transaction information for the at least one address, and the at least one address with the encrypted at least one secret derivation path;

decrypting, by the signing service, the at least one secret derivation path, using a first private key of the first key pair of the signing service;

deriving, by the signing service, a second private key of a second key pair using the decrypted at least one secret derivation path; and signing, by the signing service, the transaction using the derived second private key.

18. The method of claim 17, wherein the transaction information for the at least one address is retrieved by the wallet service from a blockchain network.

19. The method of claim 17, further comprising publishing the signed transaction to a blockchain network.

20. The method of claim 17, wherein the at least one secret derivation path is randomly generated.

* * * * *